United States Patent
Gier et al.

(10) Patent No.: US 6,401,533 B1
(45) Date of Patent: Jun. 11, 2002

(54) LEVEL INDICATOR

(75) Inventors: Lothar Gier; Werner Wallrafen, both of Bundesrepublik (DE)

(73) Assignee: Mannesmann VDO AG (DE)

( * ) Notice: Subject to any disclaimer, the term of this patent is extended or adjusted under 35 U.S.C. 154(b) by 0 days.

(21) Appl. No.: 09/341,750
(22) PCT Filed: Dec. 23, 1997
(86) PCT No.: PCT/EP97/07267
§ 371 (c)(1), (2), (4) Date: Dec. 27, 1999
(87) PCT Pub. No.: WO98/31991
PCT Pub. Date: Jul. 23, 1998

(30) Foreign Application Priority Data

Jan. 16, 1997 (DE) .......................... 197 01 246

(51) Int. Cl.[7] .......................... G01F 23/62; G01F 23/72; G01F 23/30
(52) U.S. Cl. ............................. 73/313; 73/317
(58) Field of Search ........................... 73/305, 314, 313, 73/317

(56) References Cited

U.S. PATENT DOCUMENTS

| 5,074,053 A | * 12/1991 | West ........................ 33/708 |
| 5,565,687 A | * 10/1996 | Berrill ...................... 250/577 |
| 5,814,830 A | * 9/1998 | Crowne ..................... 250/577 |

* cited by examiner

Primary Examiner—Hezron Williams
Assistant Examiner—Rose M. Miller
(74) Attorney, Agent, or Firm—Richard A. Speer; Mayer Brown Rowe & Maw

(57) ABSTRACT

A fluid level sensor that is particularly useful in fluid fuel tanks of motor vehicles wherein a resistor network is arranged on a fixed support and it is possible to generate an output signal from the resistor network which corresponds to the position of a float member. The level sensor has particularly low wear and is inexpensive to produce with a contact structure for the resistor network that operates through interaction of a magnetic member is moved by the float and can be deflected such that an electrical connection is dependent on the position of the float.

22 Claims, 8 Drawing Sheets

LEVEL INDICATOR

BACKGROUND OF THE INVENTION

1. Field of the Invention

The invention relates to a level sensor, in particular for the fuel tank of a motor vehicle, in which a resistor network is arranged on a fixed support, it being possible to pick off an output signal on the resistor network, which signal corresponds to the position of a float which follows the level of a liquids.

2. Description of the Related Art

Level sensors of this nature are known for use in motor-vehicle fuel tanks in connection with delivery units. In the installed state, such delivery units are supported on the base of the vehicle fuel tank. The level sensor is in this case arranged directly on the splash pot or is arranged on a sensor support which in turn is attached to the splash pot. A slide potentiometer of the level sensor is actuated by a float, vial a float lever, as a function of the level in the fuel tank. The changing level allows a corresponding electrical signal to be picked up at the slide potentiometer.

WO 94/27119 A1 has disclosed a level sensor with a variable resistance. A float is used to move a sensor magnet which is connected to a contact structure, the contact elements of which slide along a slide potentiometer. The resistor network of the slide potentiometer is arranged on a circuit board, it being possible to pick up on the resistor network an output signal which is dependent on the level of the liquid.

A variable resistor which comprises a resistor layer covering its entire surface and a magnetic contact structure which is arranged at a distance from this resistor layer is known from the citation WO 81/03077 for suppressing the drawback of wear to the mechanical components of such a slide potentiometer. Depending on the position of a magnet, parts of the contact structure are pulled onto the resistor layer and thus form an electrical connection. It is difficult to seal such a device with respect to external influences.

SUMMARY OF THE INVENTION

The invention is therefore based on the object of providing a level sensor which operates with low wear, is inexpensive to produce, has a high level of accuracy and is sealed with respect to external influences.

The advantage of this level sensor consists in the fact that it operates entirely without wear. Furthermore, it has a high level of contact reliability and a high resolution. The contact structure may be any structure which has any form of tongue-like spring elements, irrespective of whether these spring elements are attached individually or a plurality of spring elements are combined as a single-piece structure.

The improvement in the contact is brought about by the contact surfaces which have been applied to the substrate, with the result that the position sensor is able to acquire a vibration-free, robust structure of only small dimensions, which is particularly advantageous for use in motor vehicles.

Since the insulating substrate is used as the housing wall, it is possible, with only a few components, to produce a level sensor which is insensitive to aggressive environmental conditions and which allows the level sensor to be immersed in the fuel.

In a refinement, conductor tracks are arranged on the substrate, the end of each conductor track forming a contact surface.

The contact structure is arranged at a constant distance from the contact surfaces, which come into contact with the contact structure under the action of the magnetic device. The contact structure may in this case be a contact spring structure or may comprise separate contact springs. However, the contact spring structure may also be a single-piece flexural bar structure.

In one embodiment, the resistor network is designed as a resistor track in layer form and may be produced using thin-film or thick-film technology. The conductor tracks are partially covered by the resistor track, and the end of each conductor track in this case forms the contact surface.

Advantageously, at least the contact surfaces and the contact structure are enclosed in a sealed housing, and the magnet device is arranged so as to be movable outside the sealed housing. Such a level sensor does not have any open contacts with respect to the surrounding medium.

A reliable method of operation can be achieved if the magnet device is preloaded toward the outside of the housing, in such a manner that it can move in gentle contact therewith.

BRIEF DESCRIPTION OF THE DRAWINGS

The invention can be in numerous different embodiments, one of which will be explained in more detail with reference to the figures illustrated in the drawing, in which:

FIG. 2b is a cross-section that illustrates the housing of the magnetic position sensor of FIG. 2a.

Identical features are provided with identical reference symbols in all the figures.

DETAILED DESCRIPTION OF THE PRESENTLY PREFERRED EMBODIMENTS

Figure 1:
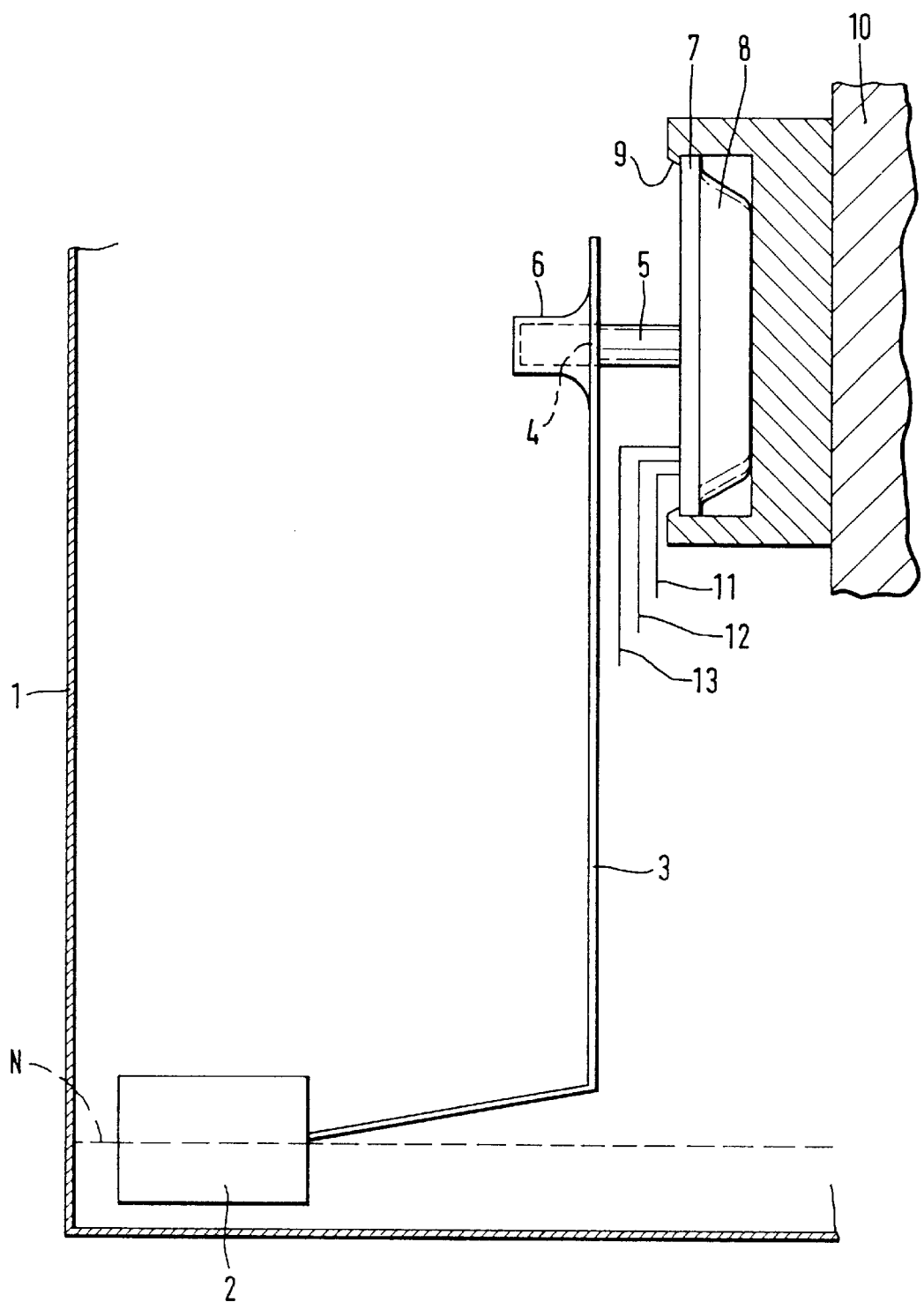
FIG. 1 illustrates an installed level sensor.

FIG. 1 diagrammatically depicts the arrangement of the level sensor according to the invention in a splash pot 1. The level N formed by the fuel is indicated by dashed lines.

A float 2 is connected to a float lever 3. At the opposite end from the float 2, this float lever 3 has an opening 4, in which a magnet 5 is arranged in a force-fitting manner in a sleeve 6. The magnet 5 which projects out of the opening 4 is preloaded toward the outside of the housing 7, 8 by means of the float lever 3, so that the magnet 5 can move with gentle contact depending on the position of the float 2.

The housing 7, 8 comprises an insulating substrate 7 which is tightly soldered, welded or adhesively bonded to a housing cover 8. Substrate 7 and the housing cover 8 are made from material with identical or similar coefficients of thermal expansion. The housing 7, 8 is attached by means of a clip-together device 9 arranged on a sensor support 10. The sensor support 10 is itself fixed to the splash pot 1, but this is not illustrated in further detail. The electric terminals 11, 12, 13 of a magnetic position sensor which is mounted in the housing 7, 8 are led out of the substrate 7. The magnetic position sensor which is arranged in the housing 7, 8 is to be explained with the aid of FIG. 2.

Figure 2A:
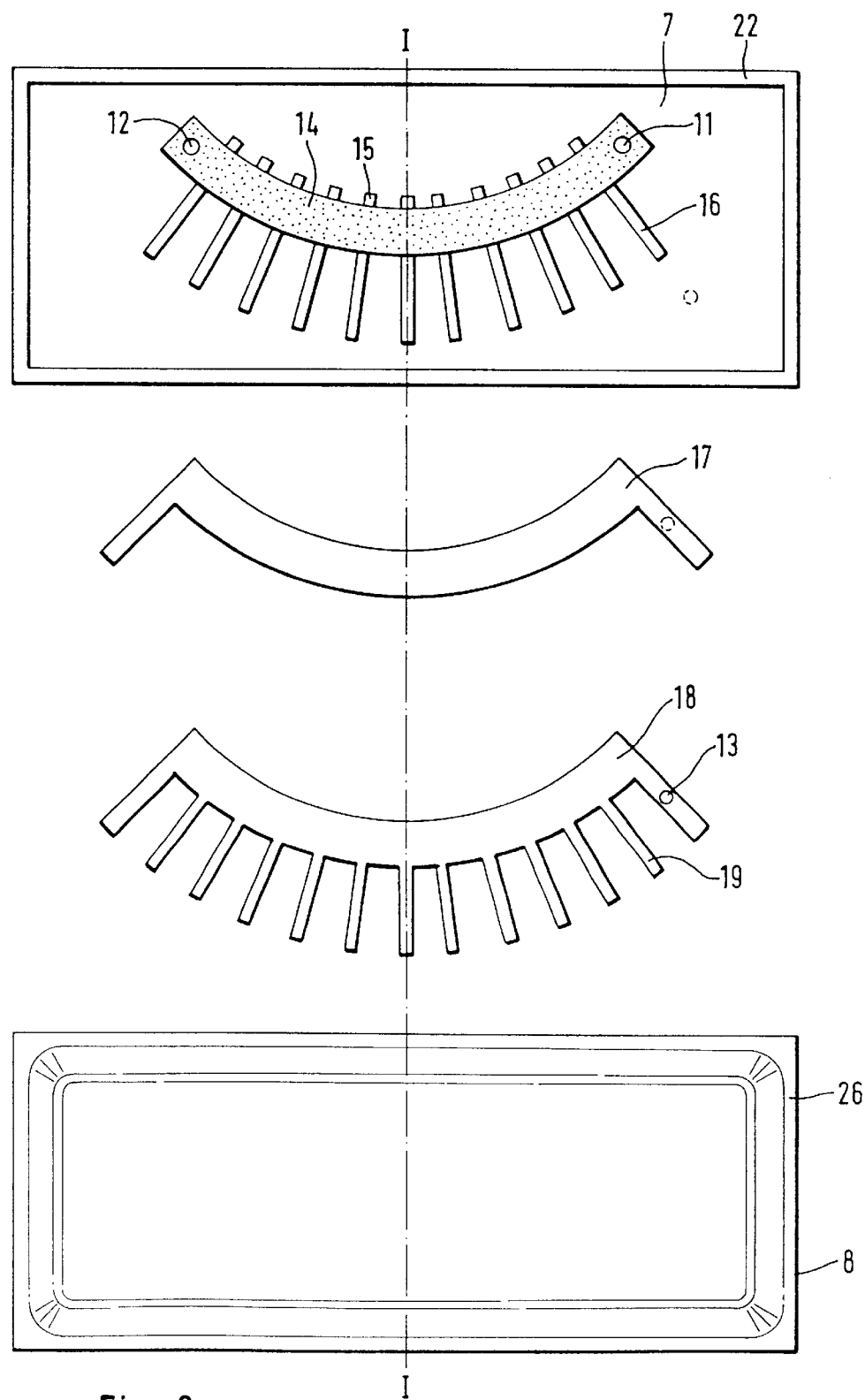
FIG. 2a is a top plan view which illustrates the housing of a magnetic position sensor.
Figure 2B:
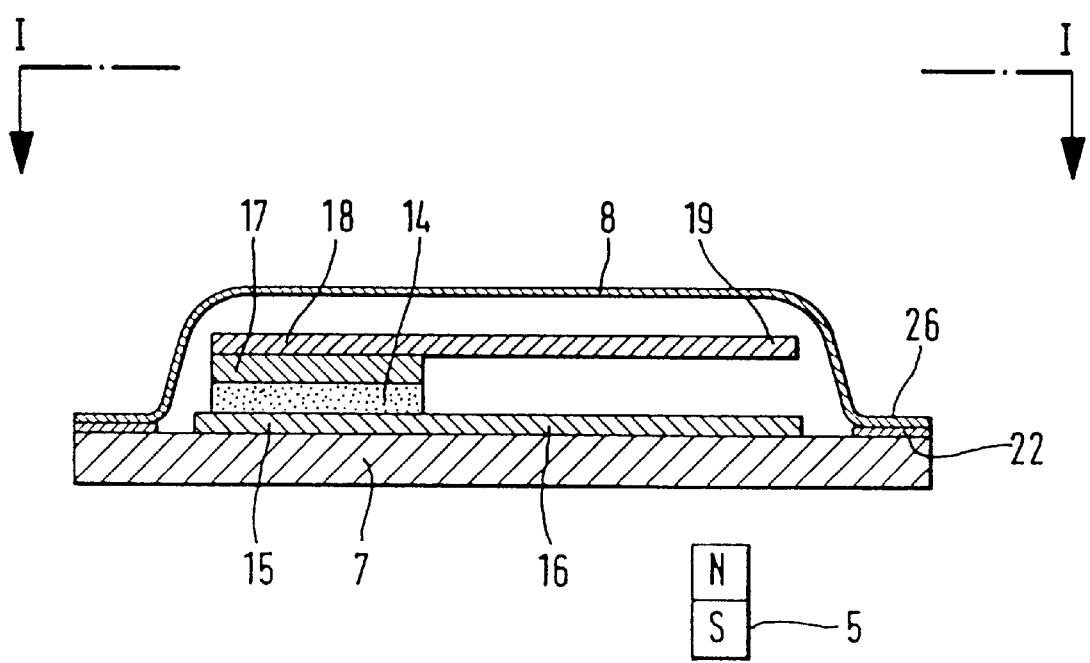

The individual parts of the magnetic position sensor are illustrated diagrammatically in FIG. 2a on the basis of a thick-film arrangement in the form of a curved potentiometer. FIG. 2b shows a section through the fitted position sensor on line I—I.

The nonmagnetic substrate 7 bears a resistor network in the form of a resistor track 14 which is in film form and extends between the electric terminals 11 and 12.

A plurality of conductor tracks 15 are arranged on the substrate 7, below the resistor track 14. The conductor tracks 15 are partially covered by the resistor track 14. In this case, an end, of each conductor track 15, which is not covered by the resistor track forms a contact surface 16 which is coated with gold or silver.

Figure 3:
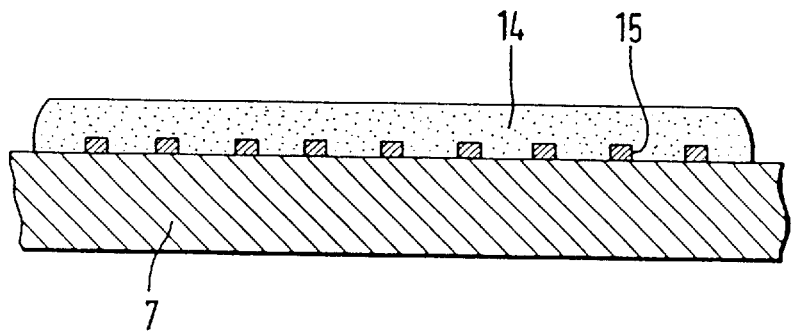
FIG. 3 shows a sectional view of a resistor track with conductor track.

The sectional illustration in FIG. 3 shows that the conductor tracks 15, in the area of the resistor track 14, are completely enclosed by the latter, in order to ensure reliable electric contact. As shown in FIG. 2, a spacer 17 is arranged on the substrate 7, congruently with the resistor track 14, to which spacer a single-piece, comb-like flexural bar structure 18 is applied in the form of a soft magnetic sheet.

As an alternative, the flexural bar structure 18 comprises nonmagnetic material which is provided with a magnetic layer.

The comb-like, soft magnetic flexural bar structure 18 comprises freely movable flexural bars 19 which are supported at one end. In order to reduce the contact resistance, the flexural bars 19 are electroplated with a layer of gold or silver.

The spacer 17 keeps the freely movable ends of the flexural bar structure 18 at a defined distance from the contact surfaces 16.

The freely movable ends of the flexural bars 19 are arranged so as to overlap the contact surfaces 16. In this case, the flexural bar structure 18, which is designed as a soft magnetic sheet, is itself electrically conductive and is connected to the external electric terminal 13.

As has already been explained, the resistor track 14 is electrically connected to ground and to the operating voltage $U_B$ via the terminals 11 and 12. The signal voltage $U_{OUT}$ of the position sensor can be picked up via the electric terminal 13, which is connected to the flexural bar structure 18. The signal voltage $U_{OUT}$ can vary within the range from 0 V to $U_B$ and represents the position of a permanent magnet 5.

The permanent magnet 5 which, as described, is arranged outside the housing 7, 8 and in such a manner that it can move with respect to the other side of the substrate 1 bearing the resistor track 2 is moved in the area where the contact surfaces 16 overlap the freely movable ends 19 of the flexural bars 19, which are supported at one end. The permanent magnet 5 may in this case be preloaded by means of a spring, in such a manner that it can move along the outside of the housing, e.g. the outside of the substrate, in contact therewith.

Figure 4:
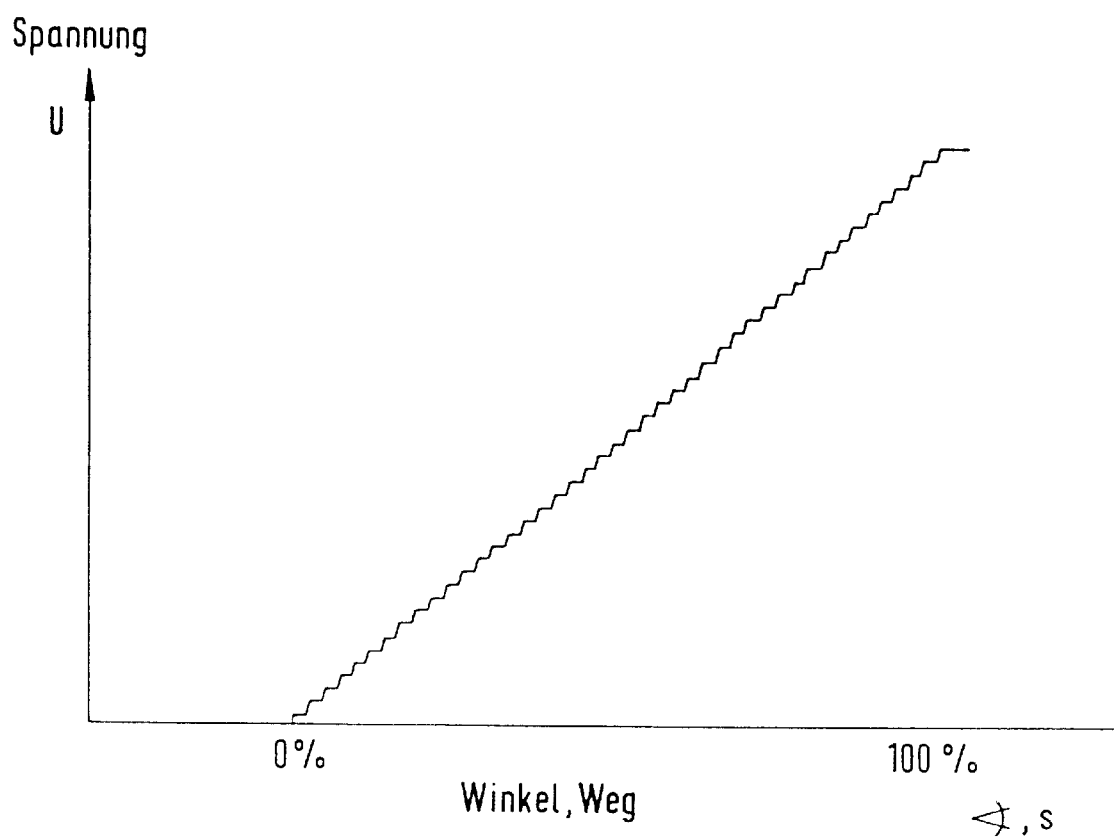
FIG. 4 shows the output signal from the level sensor.

The freely movable ends of the flexural bars 19 of the flexural bar structure 18 are drawn onto and brought into contact with the contact surfaces 16 by the magnetic field of the permanent magnet 5. Depending on the position of the permanent magnet 5, electrical connection to the associated resistors of the resistor network is produced and a signal voltage $U_{OUT}$ which corresponds to this position is picked up. The result is a stepped output signal, as illustrated in FIG. 4.

The width of the permanent magnet 5 is dimensioned in such a way that a plurality of adjacent, freely movable ends 19 of the flexural bar structure 18 simultaneously come into contact with the corresponding contact surfaces 16 and thus have a redundant action, so that any contact interruptions do not cause a complete signal failure of the measurement system.

Figure 5:
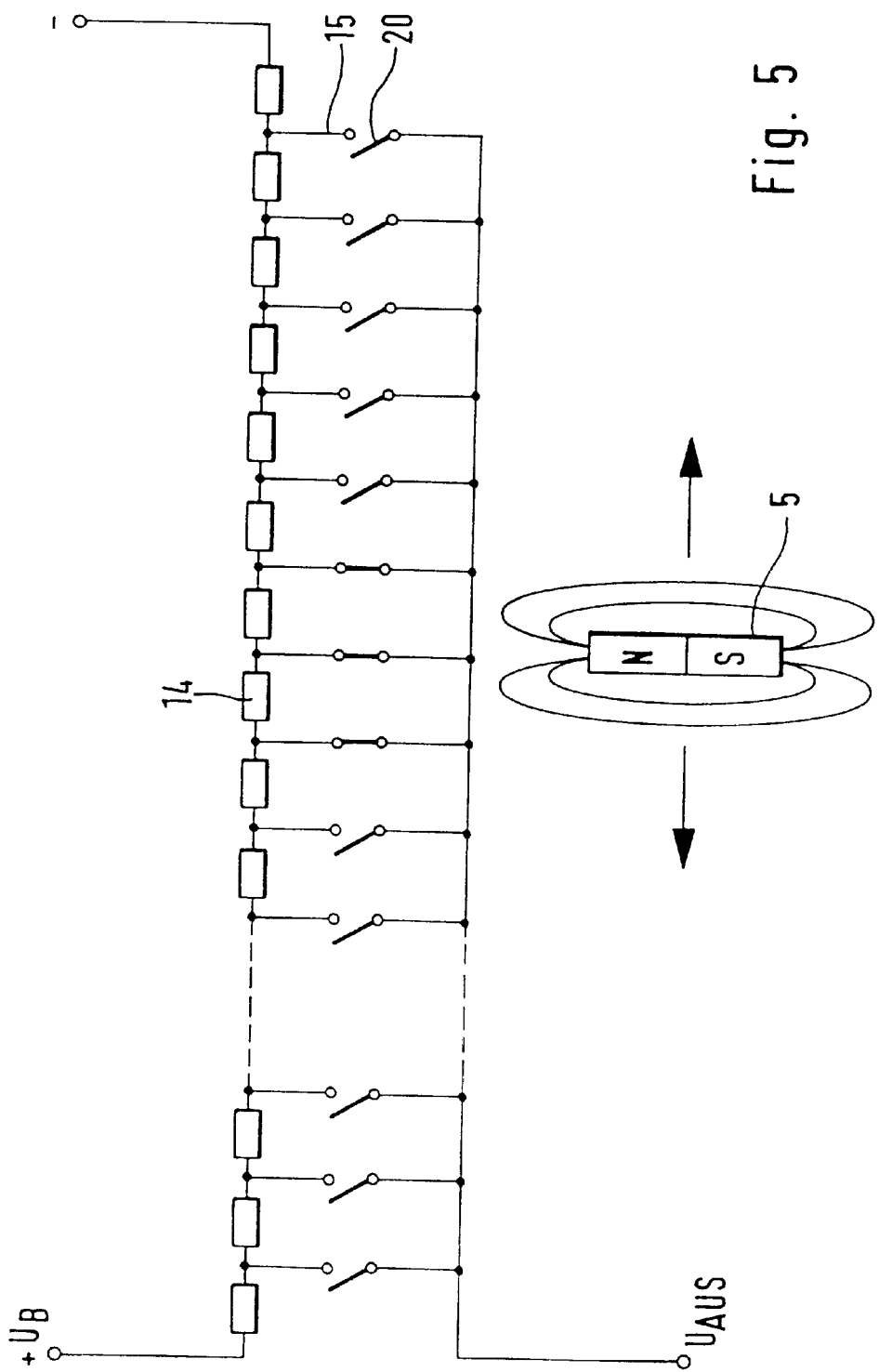
FIG. 5 shows an equivalent circuit diagram of the magnetic position sensor.

This is shown more clearly in the equivalent electrical circuit diagram of the position sensor shown in FIG. 5.

As has been described, the individual resistors of the resistor network 14 may be designed as a track or as separate individual resistors.

The contact between the flexural bar elements 19 and the contact surfaces 16 on the conductor tracks 15 leads to a switch 20 being closed, thus generating the output signal $U_{OUT}$.

By means of a heat-resistant and self-adhesive sheet which does not produce any gases, the spacer 19 is attached to both the flexural bar structure 18 and the insulating substrate 7. In order to produce direct electrical connection, the spacer 17 may be of metallic design.

The spacer 17 may preferably also be made from the same material as the substrate 7.

A transversely curved flexural bar structure 18 may also be used to produce the spacing between the flexural bars 19 and the contact surfaces 16.

The insulating substrate 7 which bears the resistor track 14 arid the soft magnetic sheet 18 comprises a ceramic plate. However, it is also conceivable to use glass or plastic supports or glass-coated or insulation-coated metal plates, as well as silicon or epoxy printed circuit board material.

The insulating substrate 7 which bears the resistor track 14, the conductor tracks 15 with the contact surfaces 16, the spacer 17 and the flexural bar structure 13 at the same time serves as the housing wall of the position sensor, which wall is closed off by means of a housing cover 8.

If a metallic housing cover 8 is used, the cover may be completely tin-coated, in order to protect against corrosion and to improve its soldering properties.

As an alternative to the metallic housing cover 8, it is also possible to use a metal-coated ceramic cover which can be soldered.

A further possibility consists in bonding the housing cover 8 to the substrate 7 using adhesive or a fusible film.

A metallized layer 22 as a surrounding edge on the insulating substrate 1 is used to encapsulate the position sensor. The metal layer 22 is tin-coated in order to improve its soldering properties.

To produce the electric terminals 11, 12, 13, pins are guided through the insulating substrate 7, where they are soldered or welded to the resistor track 14 or the flexural bar structure 18 in a hermetically sealed and therefore corrosion-resistant manner.

As an alternative, it is also possible for connecting wires 23 to be guided outward via in each case one sealed glass bushing 27, each glass bushing leading either through the substrate 7 or through the housing cover 8.

Figure 6:
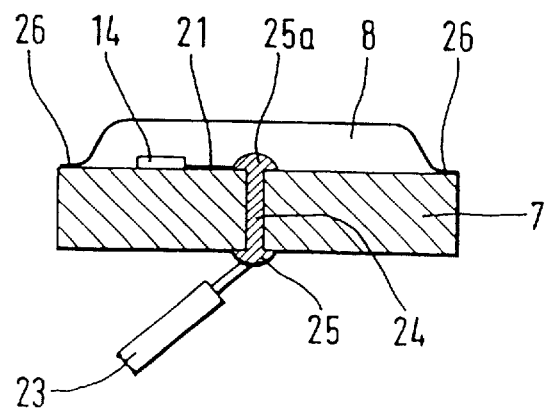
FIG. 6 shows how contact is made with the electric terminals.

In a further embodiment, as illustrated in FIG. 6, the bushing holes for the electric terminals, e.g. terminal 11 in substrate 7 (or the housing cover 8), can be sealed by soldering them closed by means of filling the bushing hole with solder 24 without connecting wires. The resultant solder point 25 at the same time serves as an electric terminal for wires 23 fed from the outside. This reliably prevents moisture from penetrating through the bushing holes into the position sensor. By means of a terminal conductor track 21 situated on the substrate 7, the resistor network 14 is connected to the solder point 25a of the solder.

Substrate 7 and housing cover 8, as described, are soldered, welded or adhesively bonded via the metallized layer 22, in the area of the surrounding edge 26 of the housing cover 8.

As an alternative to the single-piece flexural bar structure 18 described, it is also possible to use individual flexural bar elements. These flexural bar elements too comprise a soft magnetic sheet and are electrically conductive. They are likewise attached to the spacer 17 by means of a self-adhesive sheet. The flexural bar elements are dimensioned in such a way that they return to their original position by means of their own spring force, without additional means, when the magnetic effect is reduced. This automatic position restoration also applies to the flexural bar structure described above.

The flexural bar elements are electrically connected to the tap 13 for supplying the position signal $U_{OUT}$. These flexural bar elements may comprise either soft magnetic material or a nonmagnetic material which is provided with magnetic layers. The flexural bar elements are in this case also partially coated with a layer of precious metal.

As has been described, the magnetic position sensor is simple to produce using thick-film technology. In this case, the thickness of the film is 5–50 μm, the width is approximately 0.2 mm and the length is approximately 100 mm. The films are applied using the known thick-film technology by means of screen printing and are then fired.

The resistor network 14 of the position sensor may be produced on the substrate or may be produced using thin-film technology. In this case, the film thickness is usually from 0.5 to 2 μm, the film width is selected to be between 5 μm and 5 mm, and the film length is from 1 mm to 100 mm.

Figure 7A:
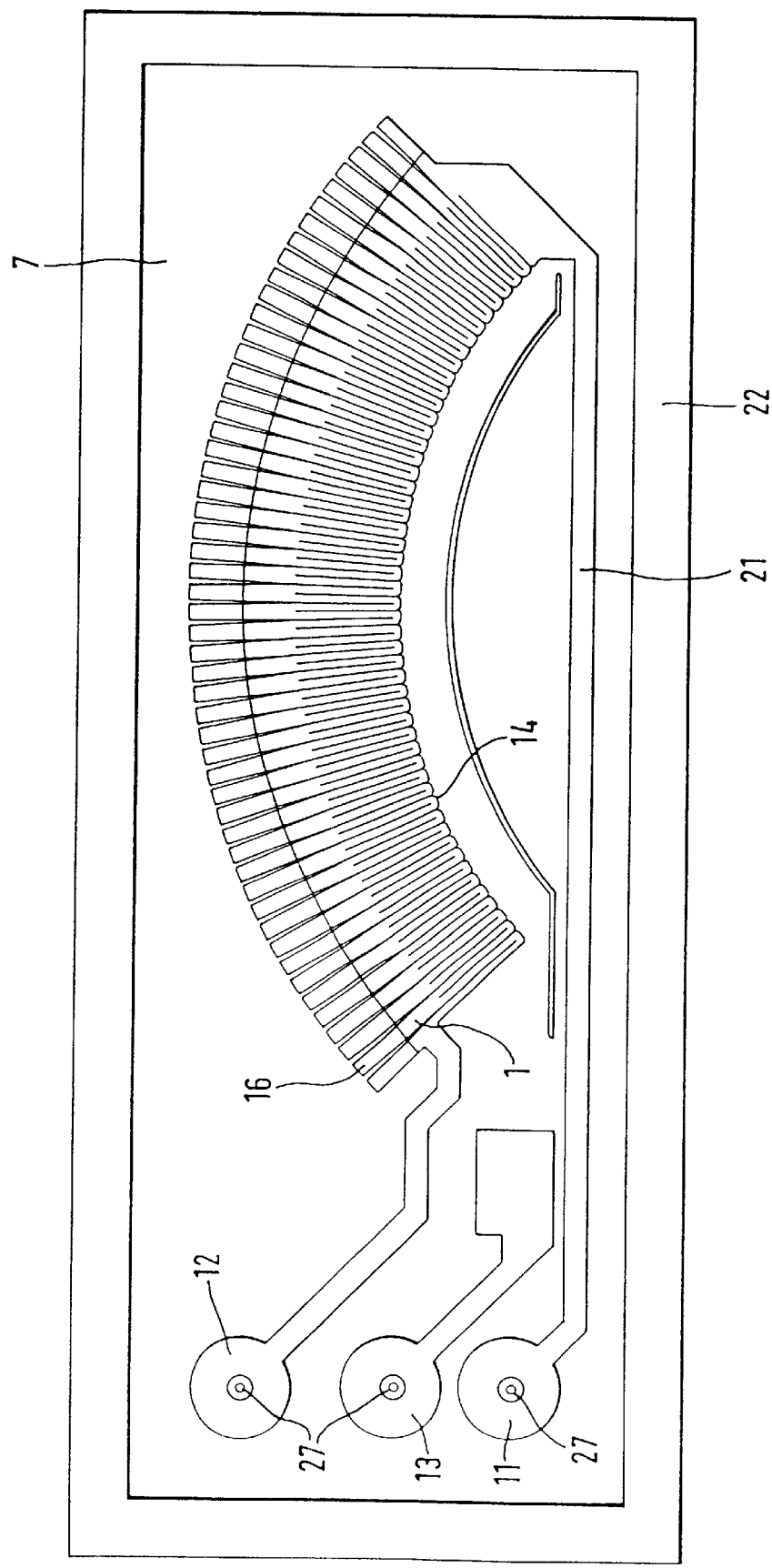
FIG. 7 shows a magnetic position sensor produced using thin-film technology.
Figure 7B:
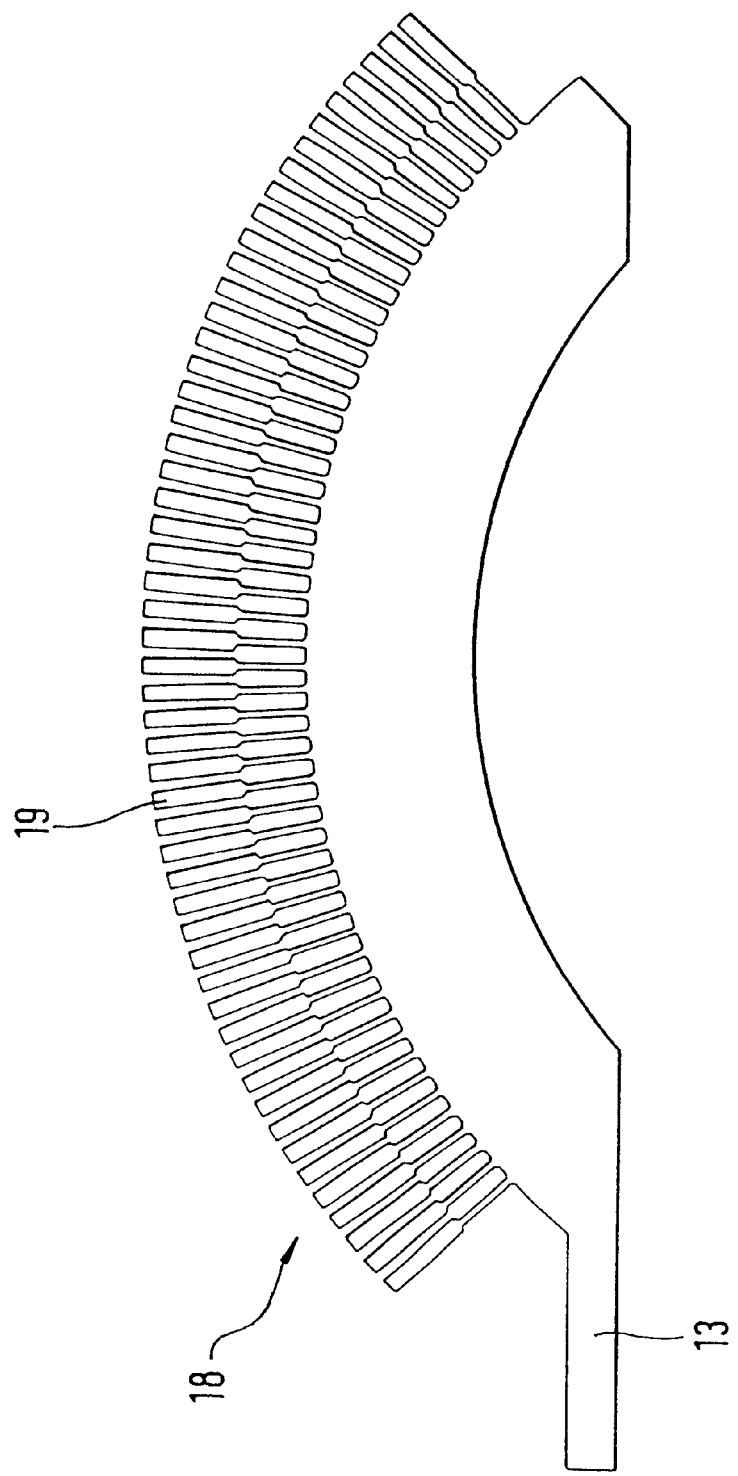

Either the conductor tracks 15 are situated between substrate 7 and resistor track 14, or the resistor track 14 is arranged directly on the substrate 7 and the conductor tracks 15 are arranged in the described configuration on the resistor track 14. This has the advantage that the entire surface of a conductor track 15 can be used as a contact surface 16 in the manner described. It is also conceivable for resistor track 14 and contact surfaces 16 to be applied to the substrate in a layout (FIG. 7a). The resistor track 14 in this case has a meandering structure, with the result that the resistor track 14 can be better divided into individual resistors. A contact surface 16 directly adjoins each meander. In the case of the flexural bar structure 18 illustrated in FIG. 7b, the flexural bars 19 are narrowed at their center, making it easier for the individual flexural bar to move.

In addition to the above-described design of the magnetic position sensor, it is also conceivable, however, for linear magnetic position sensors to be used for the level sensor.

What is claimed is:

1. A fluid level sensor comprising a resistor network on a fixed support, wherein the resistor network is adjacent to, a contact structure, a magnet member attached to a float such that an electrical connection which is dependent on the position of the float and magnetic member occurs, the resistor network being arranged on an insulating substrate and nodes of the resistor network being connected to contact surfaces on the substrate, a housing cover enclosing the resistor network and further wherein the fluid level sensor has only the single magnetic member which bends a portion of a magnetic strip of material to make selective electrical contact without interaction with any other magnetic members.

2. The fluid level sensor as claimed in claim 1, wherein conductor tracks are arranged on the substrate and wherein one end of each conductor track forms a contact surface.

3. The fluid level sensor as claimed in claim 2, wherein the conductor tracks are partially covered by the resistor network, and an end, of each conductor track, which is not covered by the resistor network forms the contact surface.

4. The fluid level sensor as claimed in claim 3, wherein the conductor tracks are designed to have a lower resistance than individual resistors of the resistor network.

5. The fluid level sensor as claimed in claim 1, wherein the contact structure is arranged at a constant distance from the contact surfaces.

6. The fluid level sensor as claimed in claim 1, wherein the contact structure is a contact spring structure.

7. The level sensor as claimed in claim 6, wherein the contact spring structure comprises separate contact springs.

8. The level sensor as claimed in claim 6, wherein the contact spring structure is a single-piece flexural bar structure.

9. The fluid level sensor as claimed in claim 6, wherein the contact spring structure comprises soft magnetic material.

10. The fluid level sensor as claimed in claim 6, wherein the contact spring structure comprises nonmagnetic material which is provided with at least one magnetic layer.

11. The fluid level sensor as claimed in claim 1, wherein the resistor network is designed as a resistor track in film form.

12. The fluid level sensor as claimed in claim 11, wherein the resistor track has a segmented structure.

13. The fluid level sensor as claimed in claim 12, wherein the contact surfaces directly adjoin the segmented structure.

14. The fluid level sensor as claimed in claim 11, wherein the resistor track is comprised of a thin-film layer.

15. The fluid level sensor as claimed in claim 11, wherein the resistor track is comprised of a thick-film layer.

16. The fluid level sensor as claimed in claim 11, wherein the conductor tracks are arranged completely or partially on the resistor track.

17. The fluid level sensor as claimed in claim 1, wherein at least the contact surfaces and the contact structure are enclosed in a sealed housing, and the magnet member is movable outside the sealed housing.

18. The fluid level sensor as claimed in claim 17, wherein the magnet member is in contact with the housing.

19. The fluid level sensor as claimed in claim 18, wherein a spring element secures the magnet device.

20. The fluid level sensor as claimed in claim 1, wherein electric terminals of the resistor network and an electric terminal of the contact spring structure are directed outward.

21. The fluid level sensor as claimed in claim 1, wherein the float is connected to the magnetic member by a float lever.

22. The fluid level sensor as claimed in claim 21, wherein the float lever holds the magnet member.

* * * * *